United States Patent
Richardson et al.

(10) Patent No.: US 9,713,968 B1
(45) Date of Patent: Jul. 25, 2017

(54) SAFETY SEAT HARNESS SYSTEM

(71) Applicants: Chad Richardson, Glendale, AZ (US); Craig Richardson, Troy, MI (US)

(72) Inventors: Chad Richardson, Glendale, AZ (US); Craig Richardson, Troy, MI (US)

(73) Assignee: DREAMBIZ LLC, Glendale, AZ (US)

( * ) Notice: Subject to any disclaimer, the term of this patent is extended or adjusted under 35 U.S.C. 154(b) by 0 days.

(21) Appl. No.: 14/879,494

(22) Filed: Oct. 9, 2015

Related U.S. Application Data

(60) Provisional application No. 62/062,068, filed on Oct. 9, 2014.

(51) Int. Cl.
*B60N 2/28* (2006.01)
*B60R 22/10* (2006.01)

(52) U.S. Cl.
CPC .......... *B60N 2/2812* (2013.01); *B60R 22/105* (2013.01)

(58) Field of Classification Search
CPC ............................ B60N 2/2812; B60R 22/105
USPC ..................................... 297/484; 24/314, 316
See application file for complete search history.

(56) References Cited

U.S. PATENT DOCUMENTS

| | | | |
|---|---|---|---|
| 4,648,625 A * | 3/1987 | Lynch | B60R 22/19 297/483 |
| 5,580,126 A | 12/1996 | Sedlack | |
| 6,880,893 B1 | 4/2005 | Scotton | |
| 6,926,359 B2 | 8/2005 | Runk | |
| 7,458,636 B2 | 12/2008 | Chen et al. | |
| 7,954,172 B2 | 6/2011 | Hepler | |
| 8,328,289 B2 * | 12/2012 | Tharp | B60N 2/2812 297/250.1 |
| 8,845,032 B2 * | 9/2014 | Bruce | A47D 15/006 297/250.1 |
| 2006/0082129 A1 | 4/2006 | Dingman et al. | |
| 2008/0079297 A1 | 4/2008 | Braxton Perry | |
| 2013/0341993 A1 | 12/2013 | Kennington et al. | |
| 2014/0070597 A1 | 3/2014 | Powell et al. | |

FOREIGN PATENT DOCUMENTS

| | | |
|---|---|---|
| EP | 2163423 A2 | 3/2010 |
| EP | 2391525 B1 | 6/2014 |
| WO | WO2013184007 A1 | 12/2013 |
| WO | WO2014138156 A1 | 9/2014 |

* cited by examiner

*Primary Examiner* — Anthony D Barfield
(74) *Attorney, Agent, or Firm* — Inspired Idea Solutions Law firm; Wayne Carroll

(57) ABSTRACT

A five-point harness system is disclosed including a right side strap, a left side strap, a right buckle connected to the right side strap, a left buckle connected to the left side strap, a center strap with a center buckle configured to receive and retain the right buckle and the left buckle. The five-point harness may also include a right side elastic strip having a right front portion coupled to the right side strap, a left side elastic strip having a left front portion coupled to the left side strap, and a center elastic strip having a center front portion coupled to the center strap. The right and the left side elastic strips may be tensioned to pull the harness straps away from each other. The center elastic strip may be tensioned to pull the center strap away from the other straps.

10 Claims, 5 Drawing Sheets

SAFETY SEAT HARNESS SYSTEM

CLAIM OF PRIORITY UNDER 35 U.S.C. §§119(e)

This application claims priority to U.S. provisional application Ser. No. 62/062,068 titled "CHILD SAFETY SEAT HARNESS SYSTEM" and filed Oct. 9, 2014; which application is incorporated herein in its entirety.

BACKGROUND

1. Technical Field

This disclosure relates to car seats, and specifically, harness systems for infant and child safety seats.

2. Background

Infant and child car seats have a 5 point safety harness system, with a belt over each shoulder that connects to a center buckle so that the harness system contacts the child at the shoulders, hips and groin. A harness chest clip is also typically used which keeps the straps in the correct position over the torso of the child.

To properly buckle a child into a child car seat, the child must be placed into the car seat and the arms of the child must go under the straps. The center buckle must also be accessible so that the straps can be buckled into the center buckle. When placing a child or an infant into a car seat the straps are often in the wrong location and the center buckle is under the child after they are placed in the child car seat. To properly buckle the seat one must often pull the straps from under the back of the child, and reach under the child to find the center buckle. This process can be uncomfortable for the child, and may create a negative experience for the child associated with using a car seat. If the child is sleeping before they are placed into the child car seat, the process of reaching behind and under the child, and manipulating the child's body to find the buckles is likely to disturb and wake-up the child.

BRIEF SUMMARY

A five-point harness system is disclosed including a right side strap configured to contact a person's right shoulder and right hip, a left side strap configured to contact the person's left shoulder and left hip, a right buckle connected to the right side strap, a left buckle connected to the left side strap, a center strap with a center buckle configured to receive and retain the right buckle and the left buckle.

The five-point harness may also include a right side elastic strip having a right front portion coupled to the right side strap, a left side elastic strip having a left front portion coupled to the left side strap, and a center elastic strip having a center front portion coupled to the center strap. The right side elastic strip and the left side elastic strip may be tensioned to pull the right side strap and the left side strap away from each other. The center elastic strip may be tensioned to pull the center strap away from the right side strap and the left side strap.

In some embodiments the right side elastic strip may have a right back portion, and the left side elastic strip may have a left back portion. The right back portion, and the left back portion may be coupled together. The center elastic strip may have a center back portion, and the center back portion may be coupled to the right back portion and the left back portion.

In some embodiments the five-point harness system may be coupled to a car seat having a first side and a second side. The right side elastic strip may have a right attachment portion coupled to the first side of the car seat, and the left side elastic strip may have a left attachment portion coupled to the second side of the car seat. The car seat may have a seat cover, and the center elastic strip may have a center attachment portion coupled to the seat cover.

A kit is disclosed for attaching to a five-point harness system having shoulder straps and a center strap connected to a center buckle. The kit may include a set of elastic strips with a right front portion having a right loop, and a left front portion having a left loop. The right loop and the left loop may be formed to allow the shoulder straps to pass through. The kit may include a center elastic strip with a center front portion having a center loop. The center loop may be formed to go over the center buckle and around the center strap. The set of elastic strips may include a right back portion connected to the right front portion, a left back portion connected to the left front portion, and a center back portion connected to the center front portion. The right back portion, the left back portion and the center back portion may be configured to be attached together. The kit may include a fastening system to connect the right back portion, the left back portion and the center back portion.

The right loop and the left loop may be formed by sewing the right front portion and the left front portion in a loop. The right loop and the left loop may be formed by attaching the right front portion and the left front portion to adjustable fasteners to form a loop. The kit may include a right fastener connected to the right front portion of the set of elastic strips and a left fastener connected to the left front portion. The right fastener may be configured to connect to the left fastener between the shoulder straps. The set of elastic strips may be configured to wrap around a right side and a left side of a car seat having a back. The set of elastic strips may be configured to connect to one another at the back of the car seat.

A car seat with a five point harness system is disclosed and may include a set of shoulder straps, a center strap, and a set of elastic strips connected to the set of shoulder straps and the center strap. The set of elastic strips may be tensioned to pull the set of shoulder straps and the center strap away from each other.

The car seat may include a cover with a right side and a left side. The set of elastic strips may be connected to the cover on the right side and the left side of the cover.

DETAILED DESCRIPTION

Figure 1:
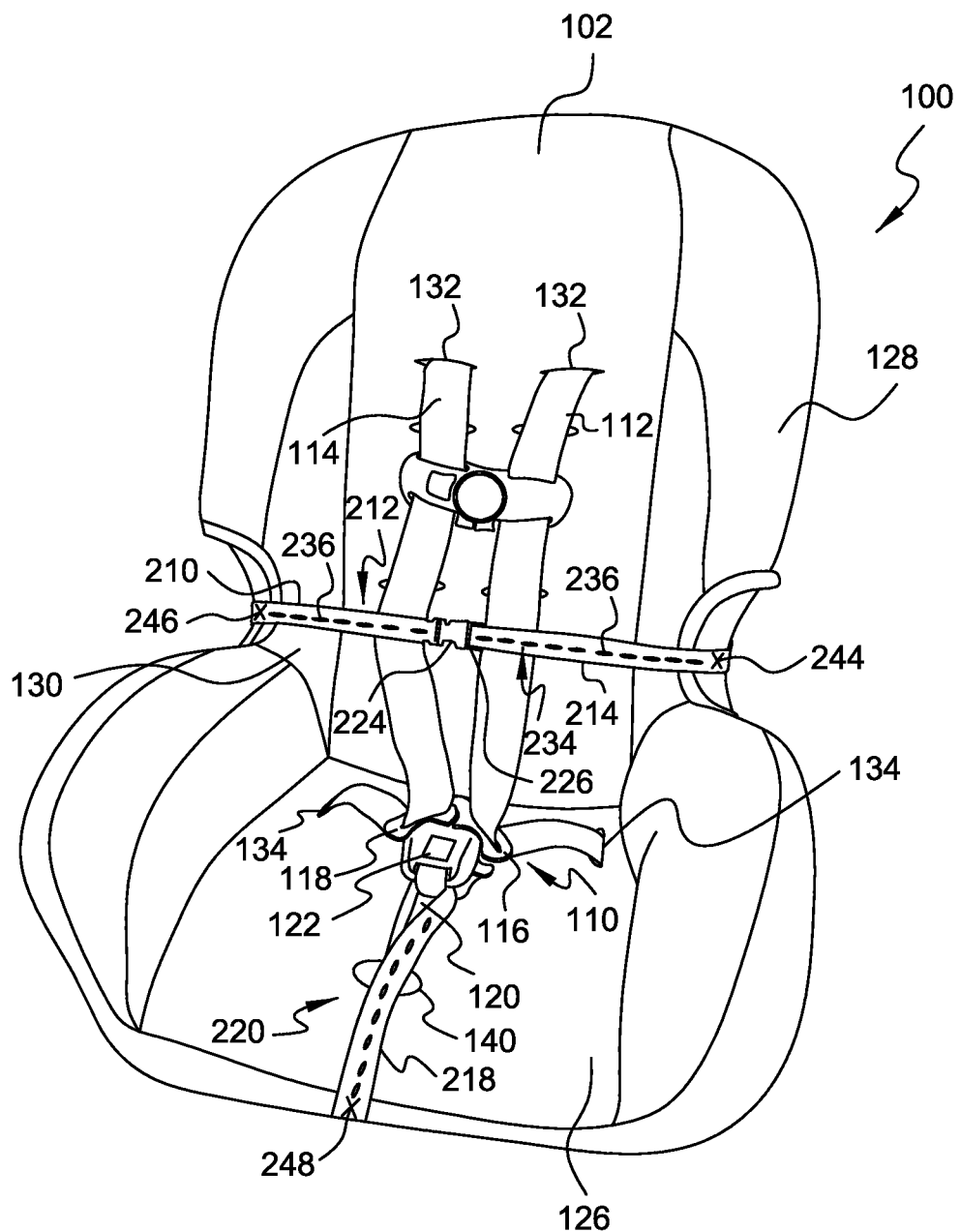
FIG. 1 is a front view of an embodiment of a harness system in a buckled position in a child car seat.

FIG. 1 shows an example according to some embodiments of a car seat 100 with a harness strap system 110 that may include a right side elastic strip 210 attached to the right side harness strap 114, and a left side elastic strip 214 attached to the left side harness strap 112. The right side elastic strip 210 may be connected to the right side 130 of the car seat 100, and the left side elastic strip 214 may be connected to the left side 128 of the car seat 100. The right side elastic strip 210 and the left side elastic strip 214 may be elastic in the example embodiment, and configured to pull the straps 112, 114 to the sides 128, 130 of the car seat 100. The elastic strips 210, 214 may have the flexibility to allow the car seat 100 to be buckled.

In various embodiments the elastic strips 210, 214 may have a mechanism for adjusting the tension of the elastic. In some embodiments the adjustment mechanism may include a friction slide buckle. Other systems for adjustment include having button holes 236 in the elastic strip and buttons to place in the holes to adjust the tension of the elastic strip, hook and loop fasteners may also be used and attached along the elastic strips 210, 214 to adjust the tension, snaps may be attached to the elastic strips 210, 214 and allow for an adjustment, a frame and prong fastener may be used adjust the tension, other types of belt fasteners or buckles may also be used. The adjustment system may be in the front 102 of the car seat 100, on the sides 128, 130 or on the back 104 (FIGS. 3, 4 and 5) of the car seat 100.

Figure 2:
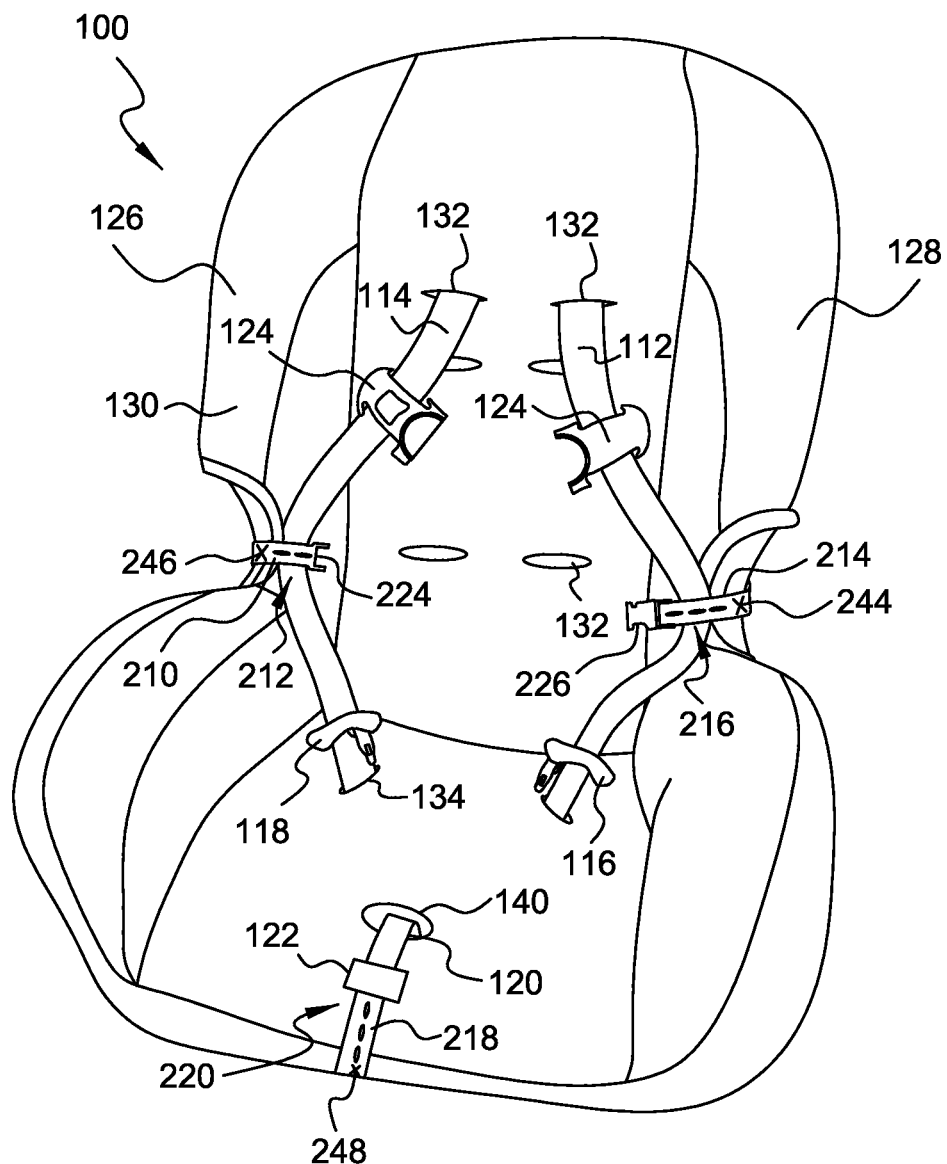
FIG. 2 is a front view of an embodiment of a harness system in an unbuckled position in a child car seat.

FIGS. 1 and 2 show a car seat 100 according to some embodiments with a five-point harness system 110 having a right side strap 114, a left side strap 112, a chest buckle 124 connecting the right side strap 114 and the left side strap 112. The right side strap 114 may pass through a right buckle 118 and left side strap 112 may pass through a left buckle 116. The right buckle 118 and left buckle 116 may attach to a center strap 120 with a center buckle 122. The car seat 100 may have front shoulder strap openings 132 for the right side strap 114 and the left side strap 112 to go into or attach to the car seat 100 after passing over the shoulder of a person in the car seat 100. The car seat 100 may include seat strap openings 134 for the right side strap 114 and the left side strap 112 to go into the car seat 100 or attach to the car seat 100 after passing over the hips of a person in the car seat 100. The car seat 100 may have a center strap opening 140 for the center strap 120 to go into the car seat 100 or attach to the car seat 100 in a position so that the center strap 120 may be between the legs of a person in the car seat 100. FIG. 1 shows the example five-point harness system 110 in a closed or buckled position. FIG. 2 shows the example five-point harness system 110 in an open or unbuckled position.

In some embodiments the right side elastic strip 210 may have a right front portion 212 that may include a right loop 228 (shown in FIG. 6) for the right side strap 114 to pass through. The left side elastic strip 214 may have a left front portion 216 that may include a left loop 230 (shown in FIG. 6) for the left side strap 112 to pass through. In some embodiments the elastic strips 210, 214 may loop around the right side strap 114 and the left side strap 112, and may slide along the straps. In some embodiments the elastic strips may be fastened to one location on the straps, or may be attached to another device that is connected to the straps, or may be connected or coupled in another way to the straps.

A center elastic strip 218 may include center front portion 220 that may have a center loop 232 (shown in FIG. 6) that may go around a center strap 120 with a center buckle 122. The center elastic strip 218 may be connected to the center strap 120 just below the center buckle 122. In some embodiments a center elastic strip 218 may be connected to the center buckle 122, or the center elastic strip 218 may be coupled to a device that is connected to the center buckle 122. The right loop 228, left loop 230 and center loop 232 may be formed with stitching 234 (shown in greater detail in the embodiment of FIG. 6).

In some embodiments the straps may pass through the loops 228, 230 easily, which may allow an elastic strip to easily move along the strap when the strap is moving from a buckled to a retracted position. In some embodiments the optimal place for the elastic strip to contact the strap may be different in a buckled position than in a fully retracted position.

In some embodiments a mated fastener may be connected to the right side elastic strip 210 and the left side elastic strip 214 between the straps 112 and 114. The mated fastener may include a right fastener 224 connected to the right side elastic strip 210, and a left fastener 226 connected to the left side elastic strip 214. The mated fastener may hold the elastic strips 210, 214 in place while allowing tension to remain on the elastic strips 210, 214 without moving the straps 112, 114 from the desired position when buckled.

In some embodiments the car seat 100 includes a cover 126 that is connected to a body of the car seat 100. The right side elastic strip 210 may include a right attachment portion 246, and the left side elastic strip 214 may include a left attachment portion 244. The right attachment portion 246 and the left attachment portion 244 may be attached to the cover 126, for example with stitching, or with a removable or adjustable fastener. The center elastic strip 218 may include a center attachment portion 248 that may be attached to the cover 126. In some embodiments the elastic strips 210, 214 and 218 may be manufactured with the cover 126 and are permanently attached to the cover 126. In some embodiments the elastic strips 210, 214 and 218 may be attached with fasteners attached to the cover 126. The right side elastic strip 210 and the left side elastic strip 214 may be attached at various positions along the sides 128 and 130 of the car seat 100. Attachment at various positions may allow a user to adjust the height of the elastic strips 210, 214 when the straps 112, 114 are adjusted and placed in a different set of front shoulder strap openings 132.

The elastic strips 210, 214 may pull the straps to the sides 128, 130 of the car seat 100. The center strap 120 may be pulled by the center elastic strip 218 towards the front of the car seat 100. In some embodiments the elastic strips 210, 214, and 218 prepare the car seat with the straps to receive a person such as a child where the straps 112, 114, and 120 may be easily accessible after the child is placed in the car seat 100.

In some embodiments the elastic strips 210, 214, and 218 may be connected to the padding or cover 126 of the car seat 100, and made as part of the car seat 100. In some embodiments the elastic strips 210, 214, and 218 may be made separate from the car seat cover 126. Some embodiments may provide greater convenience where the elastic strips 210, 214, and 218 may be attached to the sides of the car seat 100, or car seat cover 126, as users may not need to install the system. The elastic strips attached to the sides 128, 130 of the car seat 100 or cover 126 may be configurable with adjustments to position, length or tension.

Figure 3:
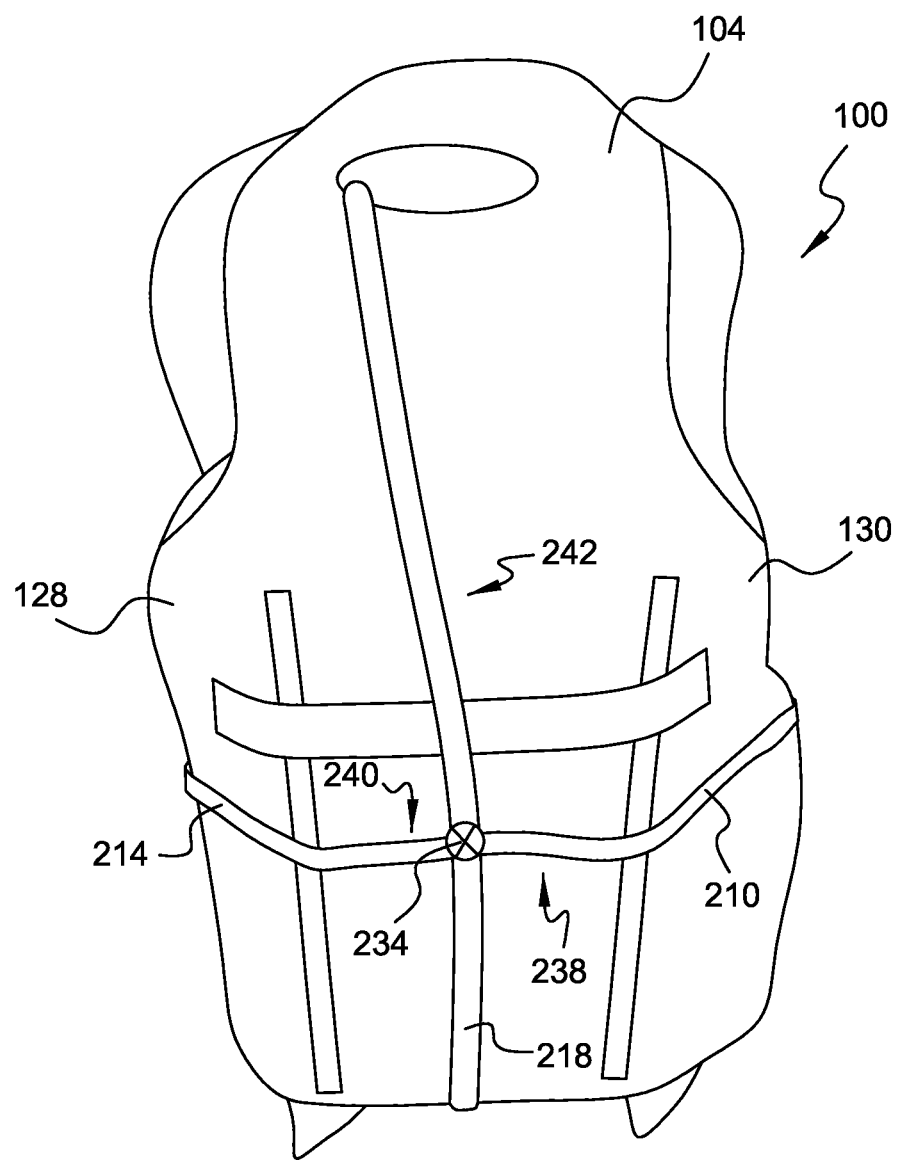
FIG. 3 is a back view of a child car seat with an embodiment of a harness system.

FIG. 3 shows an example according to some embodiments with elastic strips 210, 214, and 218 that may go around the car seat 100. FIG. 3 is a rear view of a car seat 100 and shows the elastic strips 210, 214, and 218 extending around the sides 128, 130 of the car seat 100 and from under the bottom of the seat. In some embodiments the right side elastic strip 210 includes a right back portion 238, and the left side elastic strip 214 includes a left back portion 240. The right back portion 238 and the left back portion 240 may connect together approximately at the center in the back 104 of the car seat 100. In some embodiments the center elastic strip 218 may include a center back portion 242 extended around the bottom of the car seat 100, and connecting with the other elastic strips 210, 214 approximately at the center of the car seat 100. In some embodiments the elastic strips 210, 214, and 218 may be connected together with stitching 234. The tension on the elastic strips 210, 214, and 218 may be adjusted with adjustable fasteners such as a slide buckle that may be placed on the elastic strips 210, 214, and 218 either on the front portions 212, 216, and 220, or along the back portions 238, 240, and 242. In some embodiments the elastic strips 210, 214, and 218 may be anchored or fastened to the car seat 100 without connecting to each other.

Referring to FIG. 3, in some embodiments the center back portion 242 of the center elastic strip 218 may be connected to a portion of the seat body of the car seat 100, and may connect to the other elastic strips 210, 214. In some embodiments the center back portion 242 of the center elastic strip 218 may be made from elastic materials, in other embodiments the elastic anchor strip may be made from other material, that may be designed to anchor the elastic strips 210, 214, and 218. The center back portion 242 may have any type of suitable fastener for fastening to a part of the car seat 100. A fastener may include a hook, hook and loop fasteners, buttons, snaps, buckles, or other types of fasteners. The center back portion 242 may be attached to the car seat 100 with a loop at the end of the elastic anchor strip, which may be attached to a portion of the back 104 of the car seat 100.

The elastic strip illustrated in the example embodiments of FIGS. 2-6 may be a continuous strip or ribbon of elastic material. In other embodiments a portion of the elastic strip is elastic, and a portion of the elastic strip is not elastic material.

Figure 4:
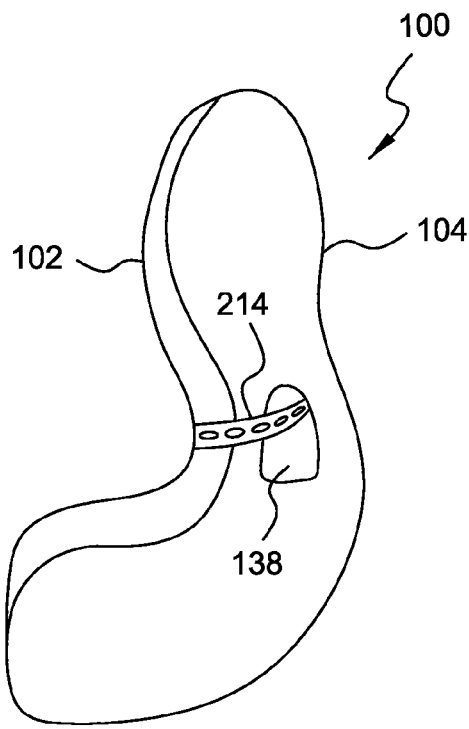
FIG. 4 is a side view of a child car seat with a harness system according to some embodiments.
Figure 5:
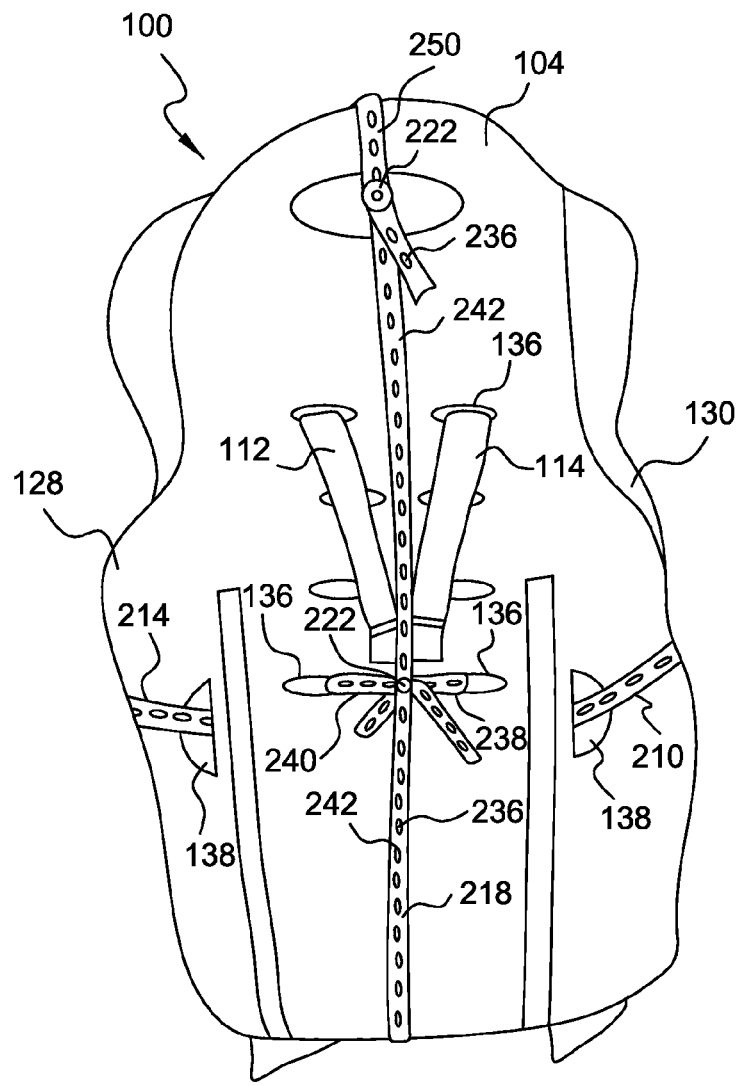
FIG. 5 is a back view of an embodiment of a child car seat with a harness system.

FIG. 4 includes a side view of an embodiment of a harness system and components. In some embodiments the elastic strips 210, 214, may be routed from the front 102 of the car seat 100 through a seat belt pass through 138 and may be attached around the car seat 100 to the back 104. FIG. 5 illustrates embodiments that may be used for securing and tightening the elastic strips 210, 214, and 218. An anchor loop 250 may be used with a fastener 222 to connect the elastic strips 210, 214, and 218 to the back 104 of the car seat 100.

Referring to FIG. 5, in some embodiments the right back portion 238 and left back portion 240 and center back portion 242 may have button holes 236 as part of a fastening system. A button or other fastener 222 may be used to adjust the tension and hold the elastic strips 210, 214, and 218 in place. In some embodiments the center back portion 242 connects to a fastener 222 that is also connected to the right back portion 238 and the left back portion 240. In some embodiments the center back portion 242 of the center elastic strip 218 may attach to the back portions 238, 240 without also attaching to another portion of the back 104 of the car seat 100.

In some embodiments the elastic strips 210, 214 may pass into the seat belt pass through 138 and out of a back shoulder strap opening 136 or other opening in the back 104 of the car seat 100. In some embodiments the elastic strips 210, 214, and 218 may pass around the back 104 of the car seat 100 and connect or otherwise secure to the car seat 100 without going through any portions of the car seat 100. The elastic strip is shown in the illustrative embodiments of FIGS. 4-6 and may go around the sides 128, 130 of the car seat 100. In this manner the embodiments of FIGS. 4-6 may be used with many different models of car seats. In some embodiments coupling the elastic strips 210, 214, and 218 together may make the system useful and configurable for a wider variety of car seats, as it may avoid dependency on specific structures that may or may not be present or accessible on some models of car seats.

Figure 6:
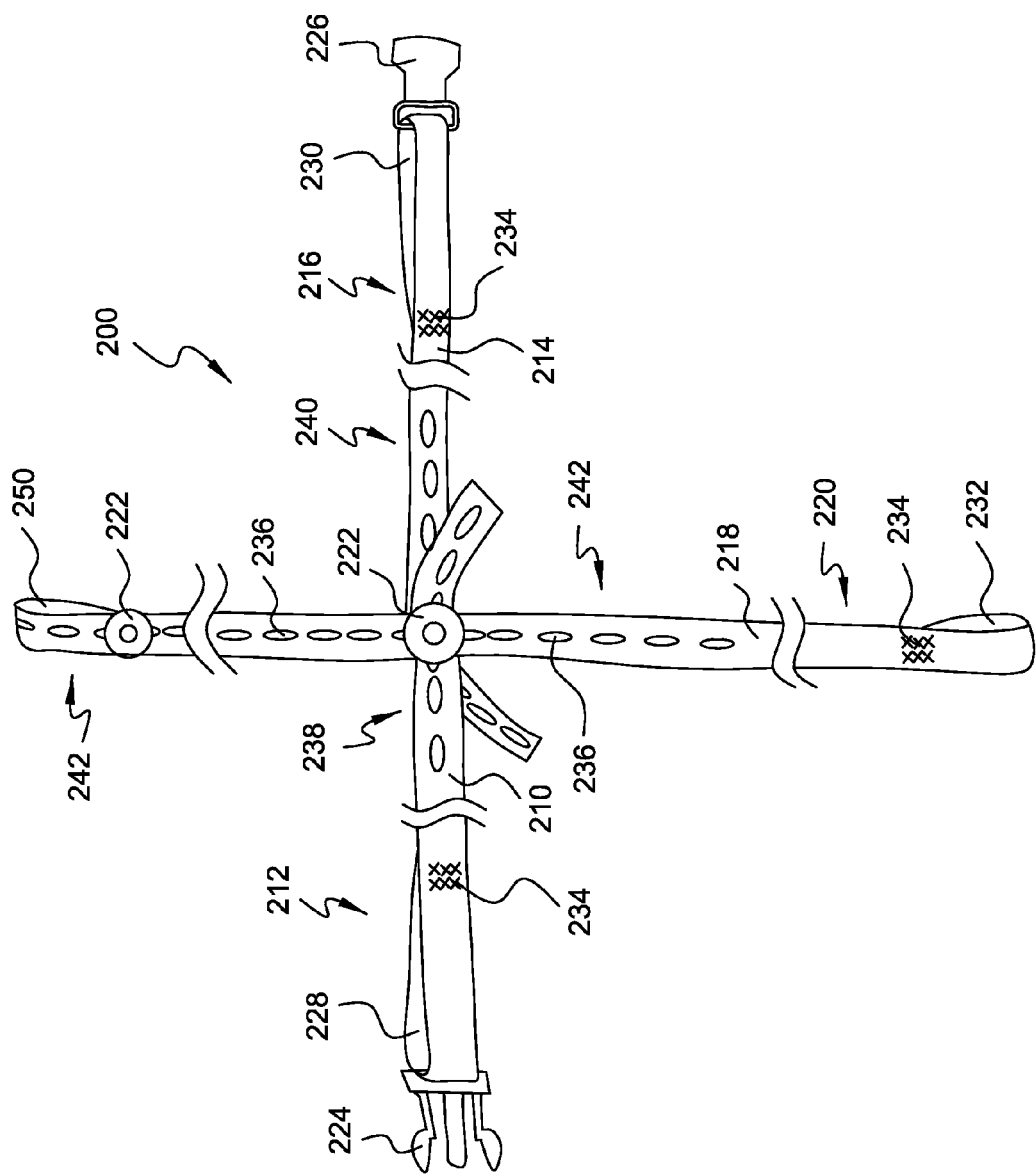
FIG. 6 is a view of kit for attaching to a child car seat with a harness system.

Referring to FIG. 6, in some embodiments a kit 200 may be used with a car seat 100, the kit 200 may include a right side elastic strip 210 that may include a right back portion 238 and a right front portion 212. The right front portion 212 may be formed into a right loop 228. A right fastener 224 may be attached to the right loop 228, for example by passing the right loop 228 through an opening in the right fastener 224. The right loop 228 may be formed from the right front portion 212 being folded into a loop and fastened. In some embodiments the right loop 228 includes stitches to fasten or form the loop. In some embodiments the right loop 228 includes an adjustable fastener as a manner of adjusting the tension of the right side elastic strip 210. The adjustable fastener may form the loop. The right back portion 238 may include button holes 236 and one or more of a fastener 222 that fits through the button holes 236.

The kit 200 may include a left side elastic strip 214 that may include a left back portion 240 and a left front portion 216. The left front portion 216 may be formed into a left loop 230 in a similar manner as described above with the right loop 228. The left back portion 240 may include button holes 236 and may connect to a similar fastener 222 as the right back portion 238. In some embodiments the kit 200 may include a center elastic strip 218 that may include a center back portion 242 and a center front portion 220. The center front portion 220 may include a center loop 232 in a similar manner as the right and left front portions 212, 216. In some embodiments the center back portion 242 includes button holes 236 and an anchor loop 250 with a fastener 222 that may allow the center back portion 242 to adjust tension on the center elastic strip 218.

The term car seat as used in this specification includes adult car seats, child car seats, infant car seats, and other seats designed for use with children or disabled adults who are not capable of properly fastening their own seat belts. While the specification discusses car seats which are removable from a vehicle, the disclosed embodiments may be useful with built-in car seats for children or adults, including built-in five-point harness car seats for adults.

In some embodiments, the right front portion 212 and the left front portion 216 may include button holes 236. The button holes 236 may be useful for attaching items to the elastic strips 210, 214 such as child toys or other items that may be useful to be within reach of a person occupying the car seat 100.

The terms straps and strips are used for convenience and do not indicate structure. Generally structure that is designed to stretch in whole or in part is referred to as strips, and structure that is not designed to stretch is referred to as straps. Straps and strips may, however, may include material that stretches or does not stretch.

While the principles of the invention have been made clear in illustrative embodiments, there will be immediately obvious to those skilled in the art many modifications of structure, arrangement, proportions, and methods, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What is claimed is:

1. A five-point harness system having a buckled position and an unbuckled position, and connected to a car seat, the five point harness system comprising:
   a right side strap configured to contact a person's right shoulder and right hip, a left side strap configured to contact a person's left shoulder and left hip, a right buckle connected to the right side strap, a left buckle connected to the left side strap, a center strap with a center buckle configured to receive and retain the right buckle and the left buckle;
   a right side elastic strip having a right front portion coupled to the right side strap, a left side elastic strip having a left front portion coupled to the left side strap, and a center elastic strip having a center front portion coupled to the center strap;
   wherein the right side elastic strip and the left side elastic strip are connected to the car seat and have a sufficient length to pull the right side strap and the left side strap away from each other moving the right side strap and the left side strap from the buckled position to the unbuckled position, and
   wherein the center elastic strip is connected to the car seat and have a sufficient length to pull the center buckle away from the right side strap and the left side strap and from the buckled position to the unbuckled position.

2. The five-point harness system according to claim 1 wherein the car seat includes a first side and a second side, wherein the right side elastic strip has a right attachment portion coupled to the first side of the car seat, and wherein the left side elastic strip has a left attachment portion coupled to the second side of the car seat.

3. The five-point harness system according to claim 2 wherein the car seat has a seat cover, and wherein the center elastic strip has a center attachment portion coupled to the seat cover.

4. A five-point harness system comprising:
   a right side strap configured to contact a person's right shoulder and right hip, a left side strap configured to contact a person's left shoulder and left hip, a right buckle connected to the right side strap, a left buckle connected to the left side strap, a center strap with a center buckle configured to receive and retain the right buckle and the left buckle;
   a right side elastic strip having a right front portion coupled to the right side strap, a left side elastic strip having a left front portion coupled to the left side strap, and a center elastic strip having a center front portion coupled to the center strap;
   wherein the right side elastic strip and the left side elastic strip are tensioned to pull the right side strap and the left side strap away from each other, and
   wherein the center elastic strip is tensioned to pull the center strap away from the right side strap and the left side strap, wherein the right side elastic strip has a right back portion, and wherein the left side elastic strip has a left back portion, and wherein the right back portion, and the left back portion are coupled together.

5. The five-point harness system according to claim 4 wherein the center elastic strip has a center back portion, and wherein the center back portion is coupled to the right back portion and the left back portion.

6. A car seat including car seat sides, the car seat including a five point harness system having a buckled position and an unbuckled position, the five point harness system comprising:
   a set of shoulder straps including a right side strap and a left side strap,
   a center strap with a center buckle, and
   a set of elastic strips connected to the set of shoulder straps and the center strap, and wherein the set of elastic strips are connected to the car seat and have a sufficient length to pull the set of shoulder straps and the center strap away from each other, moving the right sidle strap and the left side strap away from the center buckle towards the car seat sides, and moving the shoulder straps and the center strap from the buckled position to the unbuckled position.

7. The car seat of claim 6 wherein the set of elastic strips include a right front portion with a right loop and a left front portion with a left loop, and wherein the right loop and the left loop allow the set of shoulder straps to pass through.

8. The car seat of claim 7 wherein the right loop and the left loop are formed by sewing the right front portion and the left front portion in a loop.

9. The car seat of claim 6 wherein the set of elastic strips include a right front portion with a right fastener and a left front portion with a left fastener, wherein the right fastener connects to the left fastener between the set of shoulder straps.

10. The car seat of claim 6 wherein the car seat includes a cover with a right side and a left side, and wherein the set of elastic strips are connected to the cover on the right side and the left side of the cover.

* * * * *